United States Patent
Chen

(10) Patent No.: US 8,115,817 B2
(45) Date of Patent: Feb. 14, 2012

(54) ANTI-SHAKE CIRCUIT FOR AN IMAGING DEVICE

(75) Inventor: Chi-De Chen, Taipei (TW)

(73) Assignee: Ability Enterprise Co., Ltd., Taipei (TW)

( * ) Notice: Subject to any disclaimer, the term of this patent is extended or adjusted under 35 U.S.C. 154(b) by 135 days.

(21) Appl. No.: 12/726,229

(22) Filed: Mar. 17, 2010

(65) Prior Publication Data

US 2011/0228113 A1 Sep. 22, 2011

(51) Int. Cl.
*H04N 5/228* (2006.01)

(52) U.S. Cl. .............. 348/208.1; 348/208.2; 348/208.3; 348/208.4; 348/208.5

(58) Field of Classification Search .... 348/208.1–208.8, 348/208.99; 396/52–55
See application file for complete search history.

(56) References Cited

U.S. PATENT DOCUMENTS

| | | | |
|---|---|---|---|
| 5,583,597 A * | 12/1996 | Enomoto | 396/55 |
| 2008/0012946 A1* | 1/2008 | Lee et al. | 348/208.4 |
| 2011/0164864 A1* | 7/2011 | Taguchi | 396/55 |

* cited by examiner

*Primary Examiner* — Yogesh Aggarwal

(74) *Attorney, Agent, or Firm* — Stout, Uxa, Buyan & Mullins, LLP

(57) ABSTRACT

In an anti-shake circuit for an imaging device, a differential circuit receives an analog sensing signal and a target signal and then generates a difference signal. An analog mathematical circuit performs at least one mathematical operation on the difference signal, resulting in generation of at least one mathematical output signal. A driver receives the at least one mathematical output signal, and, accordingly, generates a driving signal and controls an actuator in order to correct the shaking movement.

20 Claims, 4 Drawing Sheets

ANTI-SHAKE CIRCUIT FOR AN IMAGING DEVICE

BACKGROUND OF THE INVENTION

1. Field of the Invention

The present invention generally relates to an anti-shake circuit for an imaging device, and more particularly to an analog anti-shake circuit that performs directly on analog sensing signals in analog field.

2. Description of Related Art

Anti-shake function for a camera becomes more indispensable as the number of pixels increases and the camera is equipped with more complex optical schemes, particular in middle-end and high-end cameras.

The anti-shake may be performed using optics, however at a high cost. Alternatively, the anti-shake may be performed using electronics, such as analog/digital mixed circuits. The mixed circuits transform analog sensing signals into digital signals, which are then processed by a digital microprocessor. Afterwards, the processed digital signals are transformed again into analog signals in order to drive an actuator. Nevertheless, the mixed circuits still have high cost, and noise may be introduced during transformations.

For the reason that neither optical nor electronic conventional anti-shake scheme can be achieved economically, a need has arisen to propose a novel anti-shake scheme that may perform anti-shake in a more economical manner.

SUMMARY OF THE INVENTION

In view of the foregoing, the embodiment of the present invention provides an economical and effective anti-shake circuit for an imaging device.

According to one embodiment, the anti-shake circuit includes a differential circuit, an analog mathematical circuit, and a driver. The differential circuit receives an analog sensing signal and a target signal and then generates a difference signal. The difference signal represents a difference between the analog sensing signal and the target signal, and the analog sensing signal represents the amount of shaking movement of the imaging device while or during a process of capturing an image. The analog mathematical circuit performs at least one mathematical operation on the difference signal, thereby generating or resulting in generation of at least one mathematical output signal. Upon receipt by the driver of the at least one mathematical output signal, the driver accordingly generates a driving signal and controls an actuator in order to correct or compensate for the shaking movement.

DETAILED DESCRIPTION OF THE INVENTION

Figure 1:
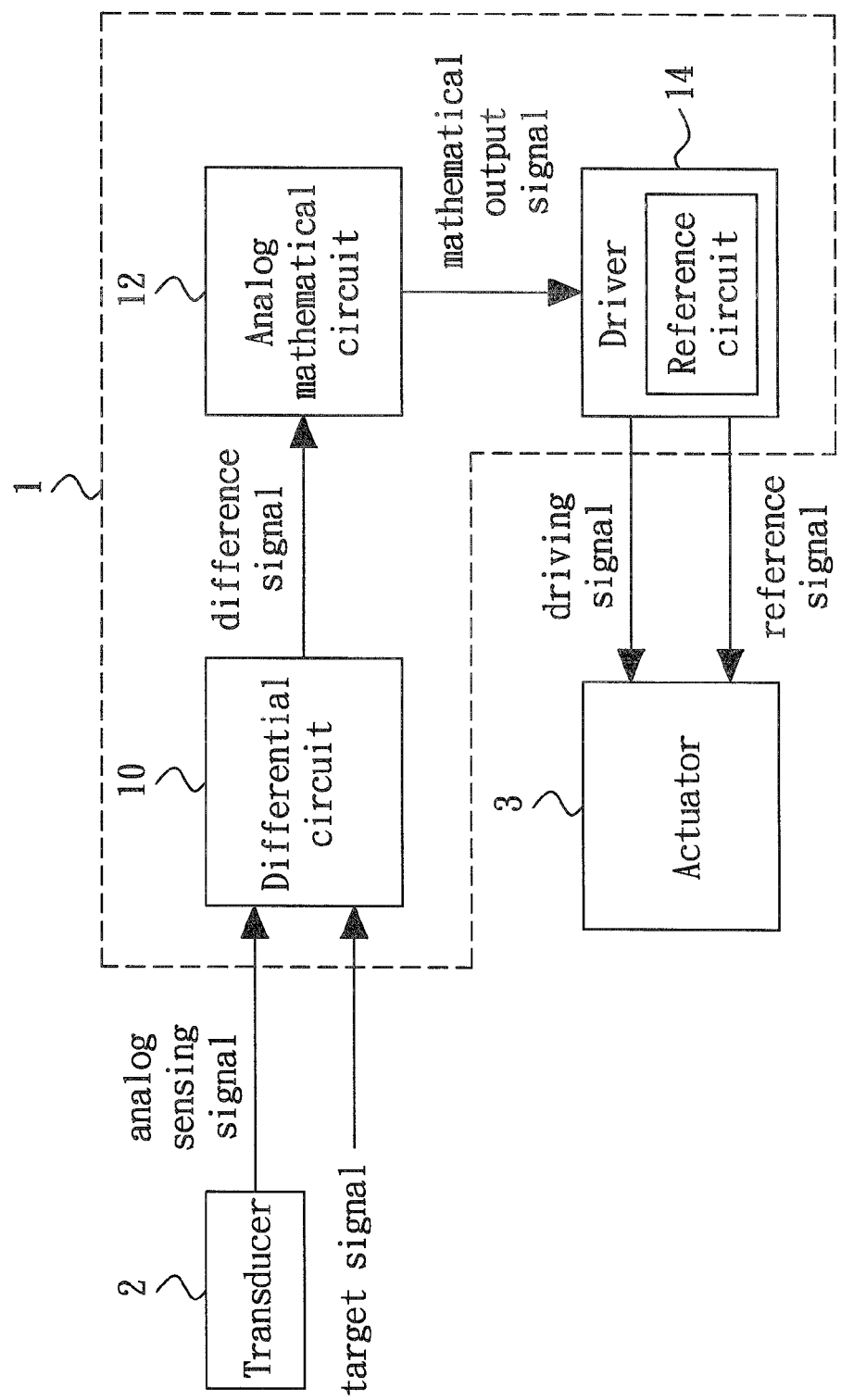
FIG. 1 is a block diagram that illustrates an anti-shake circuit for an imaging device according to one embodiment of the present invention.

FIG. 1 is a block diagram that illustrates an anti-shake circuit 1 for an imaging device according to one embodiment of the present invention. The imaging device may be a digital still camera, a video camera, a mobile phone with a camera, a web camera, or other type of imaging device. In the embodiment, the anti-shake circuit 1 includes a differential circuit 10, an analog mathematical circuit 12, and a driver 14. Specifically, the differential circuit 10 receives a target signal and an analog sensing signal, and then generates a difference signal that represents the difference between the target signal and the analog sensing signal. The analog sensing signal represents the amount of shaking movement of the imaging device while capturing an image, and is generated, for example, by a transducer 2 in response to a change of the shaking movement. In the embodiment, the transducer 2 is a Hall effect sensor that varies the analog sensing signal in response to the change in magnetic field. In addition to generating the difference signal, the differential circuit 10 may possess further functionality such as amplification. Both the differential function and the amplification function may be achieved at the same time, for example, by using one or more operational amplifiers.

The analog mathematical circuit 12 receives the difference signal and then performs at least one mathematical operation on the difference signal, thereby generating and providing (e.g., on an output) at least one mathematical output signal. In addition to generating the mathematical output signal, the analog mathematical circuit 12 may possess a further functionality such as amplification. Both the mathematic function and the amplification function may be achieved at the same time, for example, by using one or more operational amplifiers.

The driver 14 is coupled to receive the mathematical output signal or signals (e.g., via the output), and then accordingly to generate a driving signal and control an actuator 3, such as a voice coil motor (VCM), in order to correct, provide a correction, or compensate for the shaking movement. Speaking more specifically, the correction of the shaking movement may be a lens-based correction, in which a floating lens is moved by the actuator. Alternatively, the correction of the shaking movement may be a sensor-based correction, in which an image sensor is moved by the actuator 3. In one embodiment, the driver 14 may further include a reference circuit 140 that is utilized to provide a reference voltage, such that the driving signal and the reference signal together provide a differential pair of driving signals for controlling the actuator 3.

Figure 2:
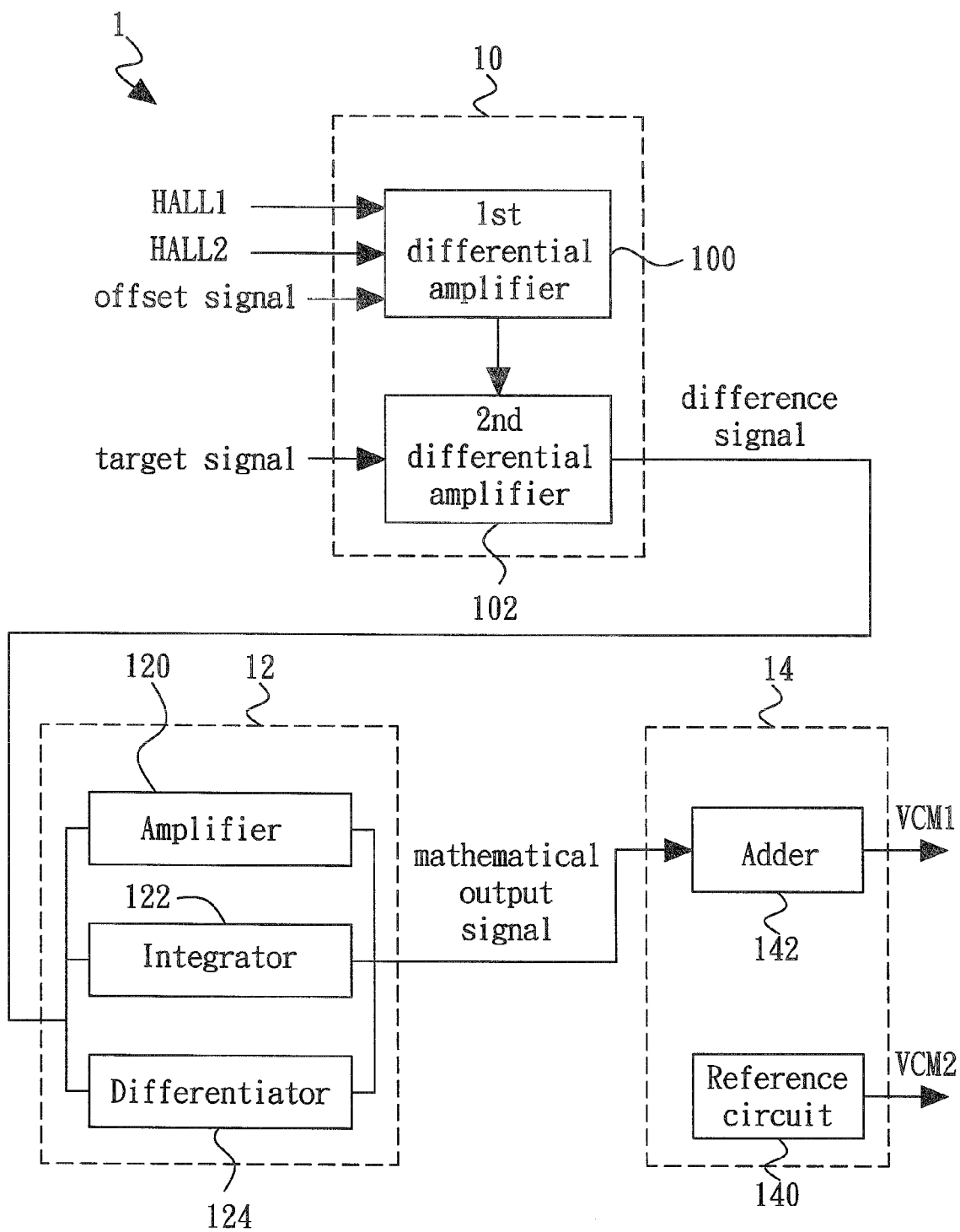
FIG. 2 is a detailed block diagram illustrating an anti-shake circuit for the imaging device according to one embodiment of the present invention.

FIG. 2 is a detailed block diagram that illustrates the anti-shake circuit 1 for the imaging device according to one embodiment of the present invention. In the embodiment, the differential circuit 10 includes a first differential amplifier 100 and a second differential amplifier 102. Specifically, the first differential amplifier 100 is coupled to receive a differential pair of the analog sensing signals HALL1 and HALL2, and then to amplify the difference between the analog sensing signals HALL1 and HALL2, thereby generating a first amplified output signal. In one embodiment, the first differential amplifier 100 may further receive an offset signal in order to cancel offset voltage or current, for example, of an operational amplifier in the first differential amplifier 100. The second differential amplifier 102 is coupled to receive the first amplified output signal and the target signal, and then to amplify the difference between the first amplified output signal and the target signal, thereby generating the difference signal.

The analog mathematical circuit 12, in the embodiment, includes an amplifier 120, an integrator 122 and/or a differentiator 124. Specifically, the amplifier 120 is used to multiply the difference signal by a predetermined value. The integrator 122 is used to perform integration on the difference signal. The differentiator 124 is used to perform differentiation on the difference signal.

The driver 14, in the embodiment, includes an adder 142 and the reference circuit 140. Specifically, the adder 142 receives and sums the mathematical output signal or signals. In the embodiment, the driving signal from the adder 142 and the reference signal from the reference circuit 140 together provide a differential pair of driving signals VCM1 and VCM2 for controlling the voice coil motor (VCM).

Figure 3:
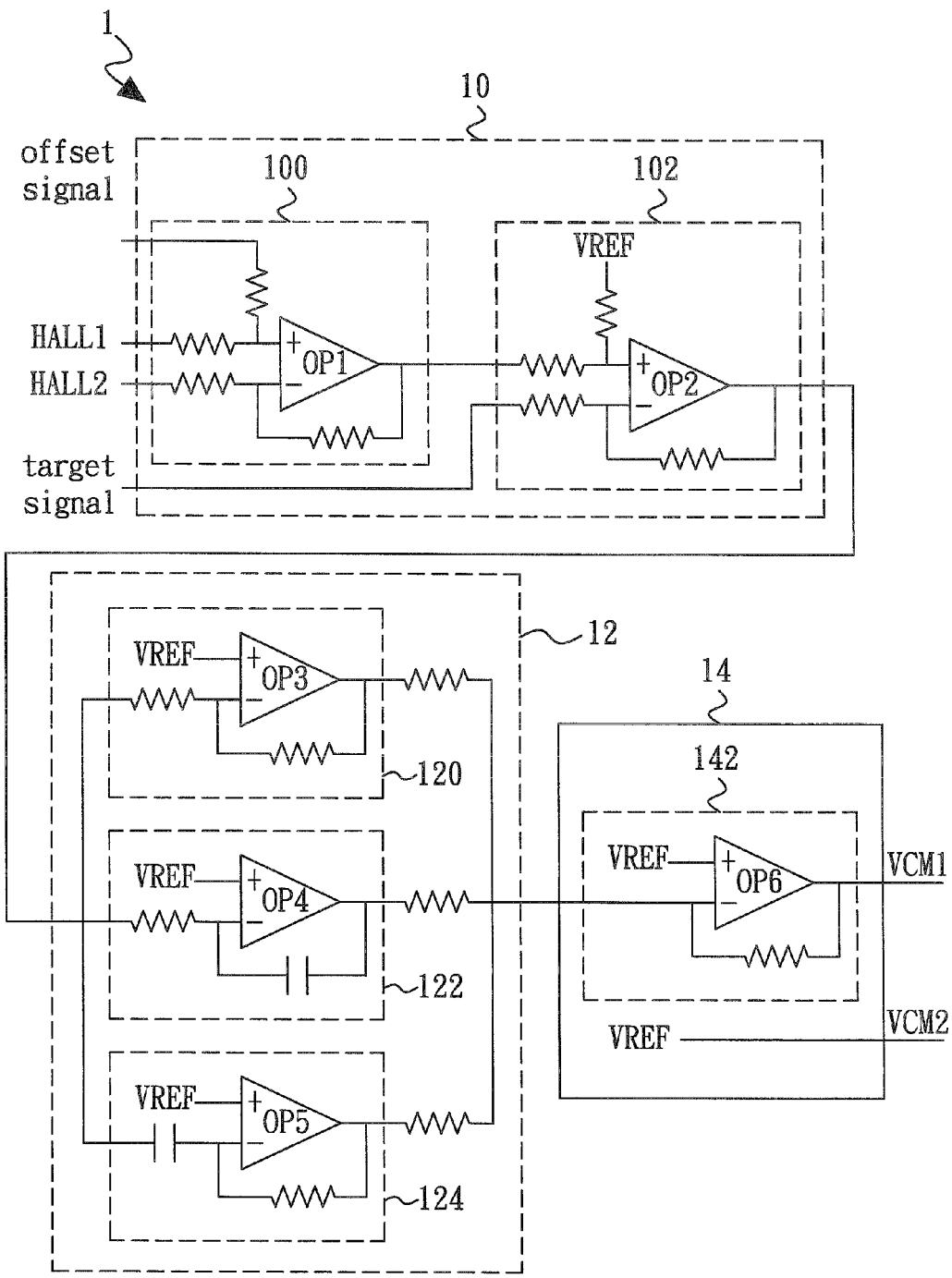
FIG. 3 shows an exemplary anti-shake circuit implemented by operational amplifiers according to one embodiment of the present invention.

FIG. 3 shows an exemplary anti-shake circuit 1 implemented by operational amplifiers (OP-Amps) according to one embodiment of the present invention. In this exemplary embodiment, the first differential amplifier 100 includes a first operational amplifier OP1 with a negative feedback. An inverting node of the first operational amplifier OP1 receives one of the analog sensing signals such as HALL2, and a non-inverting node of the first operational amplifier OP1 receives another of the analog sensing signals such as HALL1. The first operational amplifier OP1 may further receive the offset signal via the non-inverting node. The second differential amplifier 102 includes a second operational amplifier OP2 with a negative feedback. An inverting node of the second operational amplifier OP2 receives the target signal, and a non-inverting node of the second operational amplifier 102 receives the first amplified output signal from the first operational amplifier OP1.

In this exemplary embodiment, the amplifier 120 includes a third operational amplifier OP3 configured as an inverting amplifier. The integrator 122 includes a fourth operational amplifier OP4 configured as an integration circuit. The differentiator 124 includes a fifth operational amplifier OP5 configured as a differentiation circuit. The adder 142, in the exemplary embodiment, includes a sixth operational amplifier OP6 configured as a summing amplifier.

Figure 4:
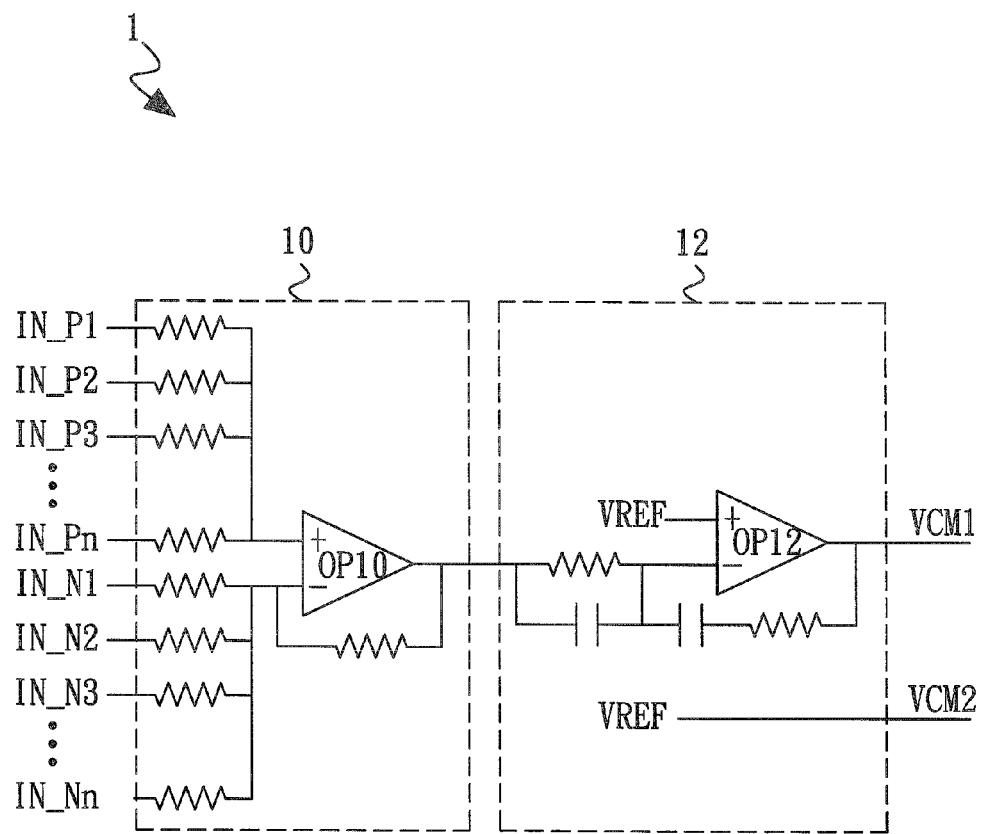
FIG. 4 shows another exemplary anti-shake circuit implemented by operational amplifiers according to an embodiment of the present invention.

FIG. 4 shows another exemplary anti-shake circuit 1 implemented by operational amplifiers (OP-Amps) according to an embodiment of the present invention. In this exemplary embodiment, the difference circuit 10 includes a single operational amplifier OP10 with a negative feedback, instead of using a number of operational amplifiers as in FIG. 3. A non-inverting node of the operational amplifier OP10 is coupled to receive the offset signal and the analog sensing signals HALL1 and HALL2 with a number of first input paths IN_P1 to IN_Pn, and an inverting node of the operational amplifier OP10 is coupled to receive, among others, the target signal with a number of second input paths IN_N1 to IN_Nn.

The analog mathematical circuit 12, in this exemplary embodiment, includes a single operational amplifier OP12 with a negative feedback, instead of using a number of operational amplifiers as in FIG. 3.

Although specific embodiments have been illustrated and described, it will be appreciated by those skilled in the art that various modifications may be made without departing from the scope of the present invention, which is intended to be limited solely by the appended claims.

What is claimed is:

1. An anti-shake circuit for an imaging device, comprising:
a differential circuit configured to receive an analog sensing signal and a target signal and to generate a difference signal that represents a difference between the analog sensing signal and the target signal, wherein the analog sensing signal represents an amount of shaking movement of the imaging device while capturing an image;
an analog mathematical circuit configured to perform at least one mathematical operation on the difference signal, and to provide on an output at least one mathematical output signal; and
a driver electrically coupled to receive the at least one mathematical output signal, and accordingly to generate a driving signal and control an actuator in order to correct or compensate for the shaking movement;
wherein the differential circuit comprises:
a first differential amplifier electrically coupled to receive a differential pair of the analog sensing signals and amplify a difference therebetween, thereby generating a first amplified output signal; and
a second differential amplifier configured to amplify a difference between the first amplified output signal and the target signal, thereby generating the difference signal.

2. The anti-shake circuit of claim 1, wherein the first differential amplifier comprises a first operational amplifier with a negative feedback, having an inverting node for receiving one of the analog sensing signals, and having a non-inverting node for receiving another of the analog sensing signals; and wherein the second differential amplifier comprises a second operational amplifier with a negative feedback, having an inverting node for receiving the target signal, and having a non-inverting node for receiving the first amplified output signal.

3. The anti-shake circuit of claim 2, wherein the first operational amplifier is further coupled to receive an offset signal via the non-inverting node.

4. The anti-shake circuit of claim 1, wherein the differential circuit comprises a single operational amplifier with a negative feedback, having an inverting node coupling with a plurality of first input paths, and having a non-inverting node coupled with a plurality of second input paths.

5. The anti-shake circuit of claim 1, wherein the analog mathematical circuit comprises one or more of the following sub-circuits:
an amplifier configured to multiply the difference signal by a predetermined value;
an integrator configured to perform integration on the difference signal; and
a differentiator configured to perform differentiation on the difference signal.

6. The anti-shake circuit of claim 1, wherein the driver comprises an adder configured to sum the at least one mathematical output signal.

7. The anti-shake circuit of claim 1, wherein the analog sensing signal is generated by a transducer.

8. The anti-shake circuit of claim 1, wherein the correction of the shaking movement is a lens-based correction or a sensor-based correction.

9. An anti-shake circuit for an imaging device, comprising:
a differential circuit configured to receive an analog sensing signal and a target signal and to generate a difference signal that represents a difference between the analog sensing signal and the target signal, wherein the analog sensing signal represents an amount of shaking movement of the imaging device while capturing an image;
an analog mathematical circuit configured to perform at least one mathematical operation on the difference signal, and to provide on an output at least one mathematical output signal; and
a driver electrically coupled to receive the at least one mathematical output signal, and accordingly to generate a driving signal and control an actuator in order to correct or compensate for the shaking movement;

wherein the analog mathematical circuit comprises one or more of the following sub-circuits:
an amplifier configured to multiply the difference signal by a predetermined value;
an integrator configured to perform integration on the difference signal; and
a differentiator configured to perform differentiation on the difference signal.

10. The anti-shake circuit of claim 9, wherein the amplifier comprises a third operational amplifier configured as an inverting amplifier; the integrator comprises a fourth operational amplifier configured as an integration circuit; and the differentiator comprises a fifth operational amplifier configured as a differentiation circuit.

11. The anti-shake circuit of claim 9, wherein the analog mathematical circuit comprises a single operational amplifier with a negative feedback.

12. The anti-shake circuit of claim 9, wherein the differential circuit comprises:
a first differential amplifier electrically coupled to receive a differential pair of the analog sensing signals and amplify a difference therebetween, thereby generating a first amplified output signal; and
a second differential amplifier configured to amplify a difference between the first amplified output signal and the target signal, thereby generating the difference signal.

13. The anti-shake circuit of claim 9, wherein the driver comprises an adder configured to sum the at least one mathematical output signal.

14. The anti-shake circuit of claim 9, wherein the correction of the shaking movement is a lens-based correction or a sensor-based correction.

15. An anti-shake circuit for an imaging device, comprising:
a differential circuit configured to receive an analog sensing signal and a target signal and to generate a difference signal that represents a difference between the analog sensing signal and the target signal, wherein the analog sensing signal represents an amount of shaking movement of the imaging device while capturing an image;
an analog mathematical circuit configured to perform at least one mathematical operation on the difference signal, and to provide on an output at least one mathematical output signal; and
a driver electrically coupled to receive the at least one mathematical output signal, and accordingly to generate a driving signal and control an actuator in order to correct or compensate for the shaking movement;
wherein the driver comprises an adder configured to sum the at least one mathematical output signal.

16. The anti-shake circuit of claim 15, wherein the adder comprises a sixth operational amplifier configured as a summing amplifier.

17. The anti-shake circuit of claim 15, wherein the driver further comprises a reference circuit configured to provide a reference voltage, such that the driving signal and the reference voltage together provide a differential pair of driving signals for controlling the actuator.

18. The anti-shake circuit of claim 15, wherein the differential circuit comprises:
a first differential amplifier electrically coupled to receive a differential pair of the analog sensing signals and amplify a difference therebetween, thereby generating a first amplified output signal; and
a second differential amplifier configured to amplify a difference between the first amplified output signal and the target signal, thereby generating the difference signal.

19. The anti-shake circuit of claim 15, wherein the analog mathematical circuit comprises one or more of the following sub-circuits:
an amplifier configured to multiply the difference signal by a predetermined value;
an integrator configured to perform integration on the difference signal; and
a differentiator configured to perform differentiation, on the difference signal.

20. The anti-shake circuit of claim 15, wherein the correction of the shaking movement is a lens-based correction or a sensor-based correction.

* * * * *